United States Patent [19]

Ost et al.

[11] 3,723,454
[45] Mar. 27, 1973

[54] N,N'-BIS-[(1'-FORMAMIDO-2',2',2'-TRICHLORO)-ETHYL]-IMIDAZOLIDINES

[75] Inventors: Walter Ost; Klaus Thomas, both of Ingelheim am Rhein, Germany

[73] Assignee: C. H. Boehringer Sohn, Ingelheim am Rhein, Germany

[22] Filed: Apr. 19, 1971

[21] Appl. No.: 135,415

[30] Foreign Application Priority Data

Apr. 24, 1970 Germany ............... P 20 19 844.1

[52] U.S. Cl. ...260/309.7, 260/239 BF, 260/256.4 Q, 260/256.4 H, 260/295 AM, 260/561 R, 424/244, 424/251, 424/263, 424/273
[51] Int. Cl. ............................................. C07d 49/30
[58] Field of Search ................ 260/309.7, 295 AM

[56] References Cited

FOREIGN PATENTS OR APPLICATIONS 408,938   9/1966   Switzerland ................. 260/309.7

OTHER PUBLICATIONS

Bohme et al. Chem. Abst. Vol. 55, column 19778 (1961). QD1.A51
Malz et al. Chem. Abst. Vol. 70, No. 3506a (1969). QD1.A51
Ost et al. Chem. Abst. Vol. 74, No. 125726a (1971). QD1.A51

Primary Examiner—Natalie Trousof
Attorney—Hammond & Littell

[57] ABSTRACT

Compounds of the formula

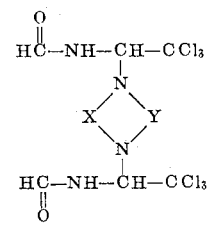

wherein X is $-(CH_2)_2-$, $-(CH_2)_3-$ or

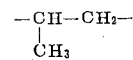

and Y is

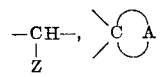

or, when X is $-(CH_2)_3-$, also $-(CH_2)_2-$;
where Z is hydrogen, phenyl, chlorophenyl, 2-furyl or 2-pyridyl; and A is tetramethylene or pentamethylene, each optionally having from 1 to 3 (alkyl of 1 to 4 carbon atoms)-substituents attached thereto,
the compounds are useful as agricultural fungicides.

3 Claims, No Drawings

N,N'-BIS-[(1'-FORMAMIDO-2',2',2'-TRICHLORO)-ETHYL]-IMIDAZOLIDINES

This invention relates to novel N,N'-bis-[(1-formamido-2',2',2'-trichloro)-ethyl]imidazolidines, hexahydropyrimidines and homopiperazines, as well as to methods of preparing these compounds.

More particularly, the present invention relates to a novel class of imidazolidines, hexahydropyrimidines and homopiperazines of the formula

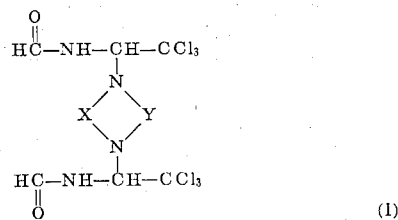

wherein X is $-(CH_2)_2-$, $-(CH_2)_3-$ or

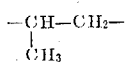

and Y is

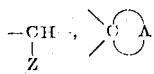

or, when X is $-(CH_2)_3-$, also $-(CH_2)_2-$;

where Z is hydrogen, phenyl, chlorophenyl, 2-furyl or 2-pyridyl; and A is tetramethylene or pentamethylene, each optically having from 1 to 3 (alkyl of 1 to 4 carbon atoms)-substituents attached thereto.

The compounds embraced by formula I may be prepared by various methods involving known chemical principles, among which the following have proved to be particularly convenient and efficient:

Method A

By reacting a 1-formamido-2,2,2-trichloro-ethane derivative of the formula

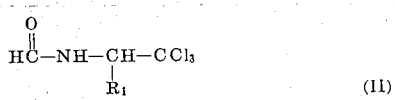

wherein $R_1$ is a substituent easily removable as an anion, preferably chlorine or bromine,
with an alicyclic diamine of the formula

wherein X and Y have the same meanings as in formula I.

The reaction is advantageously performed in the presence of an acid acceptor, preferably of a tertiary aliphatic amine, such as triethylamine, or of an alkali metal carbonate, such as sodium carbonate, at a temperature between −10° and 100°C, but preferably at room temperature, and optionally in the presence of a inert solvent medium. Examples of suitable solvent media for the reaction are tetrahydrofuran, dioxane, acetone, ethyl acetate and 1,1,2,2-tetrachloroethane, as well as lower aliphatic alcohols, such as methanol or ethanol, or an aprotic solvent, such as dimethylformamide or dimethylsulfoxide. In those instances where an alkali metal carbonate is used as the acid acceptor, it is sometimes advantageous to provide as the solvent medium a mixture of water and an organic solvent which is water-immiscible or only sparsely water-miscible, such as ethyl acetate.

Method B

By reacting an N,N'-bis-[(1-formamido-2,2,2-trichloro)-ethyl]-alkylenediamine of the formula

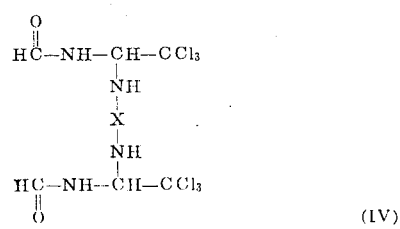

wherein X has the same meanings as in formula I, especially $-(CH_2)_2-$ or $-CH(CH_3)-CH_2-$, with an aldehyde of the formula $$OHC - Z \qquad (V)$$

wherein Z has the same meanings as in formula I. The reaction yields a compound of the formula I wherein Y is $-CH(Z)-$; it is carried out at a temperature of about 0° to 80°C, preferably at room temperature; and advantageously in the presence of a solvent, such as mixtures of acetic acid and a lower aliphatic alcohol, such as methanol.

The majority of the compounds of the formula I obtained by the above methods are crystalline substances; a few of them are amorphous. The basicity of the compounds, except those where Z is pyridyl, is very low, so that they form acid addition salts only with strong acids under exclusion of moisture, and these salts are very easily split by hydrolysis.

The following examples further illustrate the present invention and will enable others skilled in the art to understand it more completely. It should be understood, however, that the invention is not limited solely to the particular examples given below.

EXAMPLE 1

N,N'-Bis-[(1'-formamido-2',2',2'-trichloro)-ethyl]-imidazoline by method B 8 ml of a 30 percent formalin solution was added dropwise to a suspension of 16.4 gm of N,N'-bis-[(1-formamido-2,2,2-trichloro)-ethyl]-ethylenediamine in a mixture of 100 ml of tetrahydrofuran and 5 ml of aqueous 50 percent acetic acid at room temperature, while stirring the latter. A clear solution was formed after a few minutes. The solution was stirred for 30 minutes at room temperature, then the solvent was distilled off in vacuo, and the light-brown syrupy residue was dissolved in methanol. The resulting solution was filtered, the filtrate was admixed with water until it became turbid, and the turbid aqueous mixture was cooled on ice. The crystalline precipitate formed thereby was collected by vacuum filtration, and the filter cake was washed with cold aqueous methanol and dried at 50°C, yielding the compound of the formula

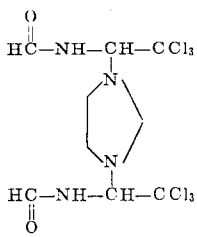

having a decomposition point of 164°–165°C.

EXAMPLE 2

N,N'-Bis-[(1'-formamido-2',2',2'-trichloro)-ethyl]-2-phenyl-imidazolidine by method B 8.1 gm of N,N'-bis-[(1-formamido-2,2,2-trichloro)-ethyl]-ethylenediamine were dissolved in a mixture consisting of 100 ml of methanol and 2.5 ml of aqueous 50 percent acetic acid; 2.1 gm of benzaldehyde were added to the solution, and the resulting mixture was allowed to stand at room temperature for 16 hours. Thereafter, the methanol was distilled off in vacuo, the viscous residue was dissolved in glacial acetic acid, and upon careful dropwise addition of water to the acid solution a crystalline precipitate formed. The crystals were collected by vacuum filtration and washed with ether, yielding the compound of the formula

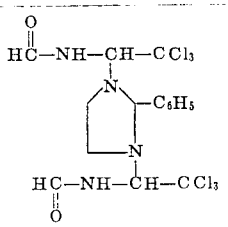

having a decomposition point of 208°–210°C.

EXAMPLE 3

N,N'-Bis-[1'-formamido-2',2',2'-trichloro)-ethyl]-2-(p-chloro-phenyl)-imidazolidine by method B A solution of 6 gm of N,N'-bis-[(1-formamido-2,2,2-trichloro)-ethyl]-ethylenediamine and 8.5 gm of p-chlorobenzaldehyde in 30 ml of glacial acetic acid was allowed to stand for three days at room temperature. Thereafter, about two-thirds of the acetic acid were distilled off in vacuo, and the residue was cooled, whereby a crystalline precipitate of colorless needles was formed; it was collected by vacuum filtration and washed with ether, yielding the compound of the formula

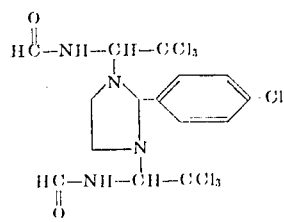

having a decomposition point of 227°C.

EXAMPLE 4

N,N'-Bis-[(1'-formamido-2',2',2'-trichloro)-ethyl]-2-(2''-furyl)-imidazolidine by method B A solution of 6 gm of N,N'-bis-[(1-formamido-2,2,2-trichloro)-ethyl]-ethylenediamine and 5 ml of 2-furaldehyde in 30 ml of glacial acetic acid was allowed to stand at room temperature for 48 hours. Thereafter, the acetic acid was distilled off in vacuo, the residue was admixed with ether, and the crystalline substance formed thereby was collected by vacuum filtration. The filter cake was identified to be the compound of the formula

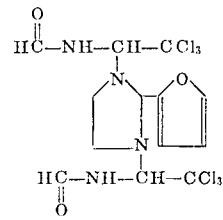

having a decomposition point of 170°–172°C.

EXAMPLE 5

N,N'-Bis-[(1'-formamido-2',2',2'-trichloro)-ethyl]-2-(2''-pyridyl)-imidazolidine by method B A solution of 6 gm of N,N'-bis-[(1-formamido-2,2,2-trichloro)-ethyl]-ethylenediamine and 6.4 gm of pyridine-2-aldehyde in 30 ml of glacial acetic acid was allowed to stand for 72 hours at room temperature. Thereafter, the acetic acid was distilled off in vacuo, the residual oil was dissolved in acetone, and the resulting solution was admixed with water until it became turbid, whereupon a crystalline substance separated out. The crystals were collected and recrystallized from dilute ethanol, yielding the compound of the formula

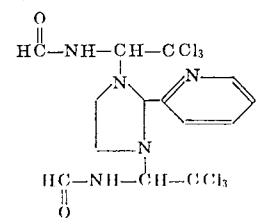

having a decomposition point of 183°C.

EXAMPLE 6

N,N'-Bis-[(1'-formamido-2',2',2'-trichloro)-ethyl]-2,2-tetramethylene-imidazolidine by method A a. A solution of 12 gm of ethylenediamine in 30 ml of benzene was added dropwise over a period of three hours to a boiling solution of 16.8 gm of cyclopentanone in 200 ml of benzene, and the water formed by the reaction was continuously removed by means of a water separator. Thereafter, the benzene was distilled off in vacuo, and the residue was carefully fractionated in a high vacuum in an atmosphere of nitrogen. The fraction passing over between 107°–108°C at 0.6 mm Hg was 2,2-tetramethylene-imidazolidine.

b. 3.7 gm of the 2,2-tetramethylene-imidazolidine thus obtained and 6.0 gm of triethylamine were dissolved in 50 ml of tetrahydrofuran, and, while stirring the resulting solution, a solution of 12.4 gm of N-[(1,2,2,2-tetrachloro)ethyl]-formamide in 30 ml of tetrahydrofuran was added dropwise thereto. Thereafter, the reaction mixture was stirred for one hour more at room temperature, then the triethylamine hydrochloride which had formed was separated by vacuum filtration, and the filtrate was evaporated in vacuo. The semi-solid brown residue was repeatedly triturated with dry ether, whereby it solidified, yielding a slightly brownish solid substance having a decomposition point of 130°–138°C which was identified to be the solvate with 0.5 mol of ether of crystallization of the compound of the formula

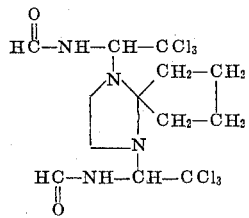

EXAMPLE 7

N,N'-Bis-[(1'-formamido-2',2',2'-trichloro)-ethyl]-2,2-pentamethylene-imidazolidine by method A a. Using a procedure analogous to that described in Example 6(a), 2,2-pentamethylene-imidazolidine, b.p. 53°–54C at 0.06 mm Hg, was prepared from ethylenediamine and cyclohexanone.

b. Using a procedure analogous to that described in Example 6(b), 2,2-pentamethylene-imidazolidine was reacted with N-[(1,2,2,2-tetrachloro)-ethyl]-formamide, and the amorphous raw product was crystallized from methylene chloride, yielding the compound of the formula

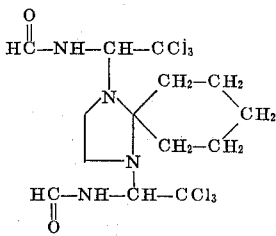

having a decomposition point of 146°–147°C.

EXAMPLE 8

N,N'-Bis-[(1'-formamido-2',2',2'-trichloro)-ethyl]-2,2-(3''-methyl-pentamethylene)-imidazolidine by method A a. Using a procedure analogous to that described in Example 6(a), 2,2-(3'-methyl-pentamethylene)-imidazolidine, b.p. 75°–78°C at 1 mm Hg, was prepared from ethylenediamine and 4-methyl-cyclohexanone.

b. Using a procedure analogous to that described in Example 6(b), 2,2-(3'-methyl-pentamethylene)-imidazolidine was reacted with N-[(1,2,2,2-tetrachloro)-ethyl]-formamide, yielding the compound of the formula

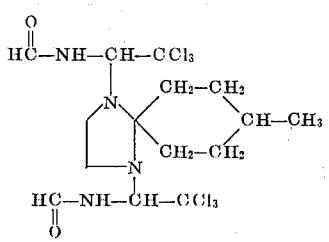

having a melting point of 90°–95°C.

EXAMPLE 9

N,N'-Bis-[(1'-formamido-2',2',2'-trichloro)-ethyl]-2,2-(2'',2''', 4''-trimethyl-pentamethylene)-imidazolidine by method A a. Using a procedure analogous to that described in Example 6(a), 2,2-(2',2',4'-trimethyl-pentamethylene)-imidazolidine, b.p. 138°–140°C at 0.25 mm Hg, was prepared from ethylenediamine and 3,3,5-trimethyl-cyclohexanone.

b. Using a procedure analogous to that described in Example 6(b), 2,2-(2',2',4'trimethyl-pentamethylene)-imidazolidine was reacted with N-[(1,2,2,2-tetrachloro)-ethyl]-formamide, yielding the compound of the formula

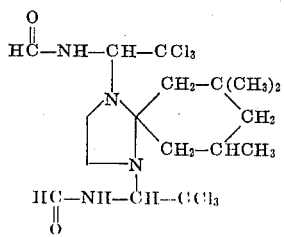

having a melting point of 98°–102°C.

EXAMPLE 10

N,N'-Bis-[(1'-formamido-2',2',2'-trichloro)-ethyl]-2,2-(3''-tert.butyl-pentamethylene)-imidazolidine by method A a. Using a procedure analogous to that described in Example 6(a), 2,2-(3'-tert.butyl-pentamethylene)-imidazolidine, b.p. 95°–97°C at 0.03 mm Hg, was prepared from ethylenediamine and 4-tert.butyl-cyclohexanone.

b. Using a procedure analogous to that described in Example 6(b), 2,2-(3'-tert.butyl-pentamethylene)-imidazolidine was reacted with N-[(1,2,2,2-tetrachloro)-ethyl]-formamide, yielding the compound of the formula

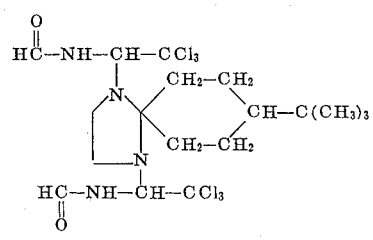

having a melting point of 72°–75°C.

EXAMPLE 11

N,N'-Bis-[(1'-formamido-2',2',2'-trichloro)-ethyl]-hexa-hydropyrimidine by method A A mixture consisting of 2.15 gm of hexahydropyrimidine (b.p. 54°–57°C at 20 mm Hg), 5 gm of triethylamine and 75 ml of tetrahydrofuran was added dropwise to a solution of 10.5 gm of N-[(1,2,2,2-tetrachloro)-ethyl]-formamide in 50 ml of tetrahydrofuran, and the resulting mixture was stirred for 30 minutes at room temperature. Thereafter, the precipitated triethylamine hydrochloride was separated by vacuum filtration, and the filtrate was evaporated in vacuo. The residual light-yellow oil crystallized upon digestion with n-hexane, yielding the solvate with 0.5 mol of tetrahydrofuran of the compound of the formula

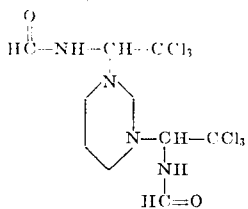

having a melting point of 70°C.

EXAMPLE 12

N,N'-Bis-[(1'-formamido-2',2',2'-trichloro)-ethyl]-2-methyl-hexahydropyrimidine

Using a procedure analogous to that described in Example 11, 2-methyl-hexahydropyrimidine (b.p. 140°–143°C at 760 mm Hg) was reacted with N-[(1,2,2,2-tetrachloro)-ethyl]-formamide, yielding the compound of the formula

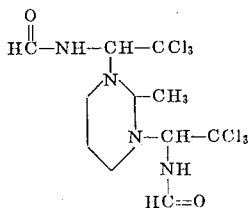

initially as a viscous oil which gradually solidified upon standing in an exsiccator over $P_2O_5$ and then had a melting point of 63°–65°C.

EXAMPLE 13

N,N'-Bis-[(1'-formamido-2',2',2'-trichloro)-ethyl]-homopiperazine

Using a procedure analogous to that described in Example 11, homopiperazine was reacted with N-[(1,2,2,2-tetrachloro)-ethyl]-formamide in ether in the presence of triethylamine. The reaction product precipitated together with the triethylamine hydrochloride and was separated from the latter by thorough washing first with water and then with ether, yielding the analytically pure compound of the formula

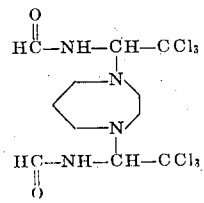

having a decomposition point of 132–135°C.

EXAMPLE 14

N,N'-Bis-[(1'-formamido-2',2',2'-trichloro)ethyl]-4-methyl-imidazolidine by method B 12 ml of an aqueous 30 percent formaldehyde solution were added dropwise to a solution of 21 gm of N,N'-bis-[(1'-formamido-2',2',2'-trichloro)-ethyl]-1,2-propylenediamine in a mixture of 200 ml of methanol and 8 ml of aqueous 50 percent acetic acid, and the resulting mixture was allowed to stand for 30 minutes at room temperature. Thereafter, it was filtered, and the volatile components were distilled out of the filtrate in vacuo. The residue was dissolved in ethanol, and upon careful dropwise addition of water to the ethanolic solution a crystalline precipitate was formed. The precipitate was collected by vacuum filtration and thoroughly washed with n-hexane, yielding the compound of the formula

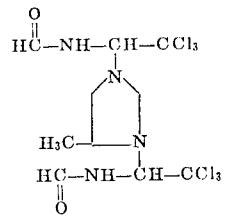

having a decomposition point of 161°–162°C.

EXAMPLE 15

N,N'-Bis-[(1'-formamido-2',2',2'-trichloro)-ethyl]-2-phenyl-4-methyl-imidazolidine Using a procedure analogous to that described in Example 14, N,N'-bis-[(1'-formamido-2',2',2'-trichloro)-ethyl]-1,2-propylenediamine was reacted with benzaldehyde, yielding the compound of the formula

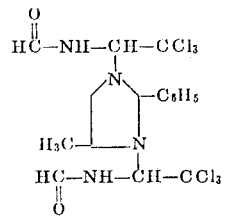

initially as a viscous oil which gradually solidified into the solvate with 0.5 mol of methanol of crystallization having a melting point of 72°–74°C.

EXAMPLE 16

N,N'-Bis-[(1'-formamido-2',2',2'-trichloro)-ethyl]-2,2-pentamethylene-4-methyl-imidazolidine a. Using a procedure analogous to that described in Example 6(a), 2,2-pentamethylene-4-methyl-imidazolidine, b.p. 46°–47°C at 0.03 Hg, was prepared from 1,2-propylene-diamine and cyclohexanone.

b. Using a procedure analogous to that described in Example 6(b), 2,2-pentamethylene-4-methyl-imidazolidine was reacted with N-[(1,2,2,2-tetrachloro)-ethyl]-formamide, yielding the solvate with 0.5 mol of tetrahydrofuran of crystallization of the compound of the formula

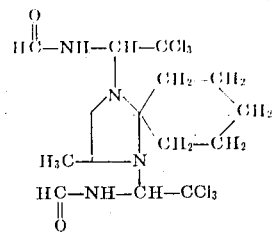

having a melting point of 58°–65°C.

The compounds according to the present invention, that is, those embraced by formula I have useful properties. More particularly, they exhibit effective systemic fungitoxic activities against a multitude of phytopathogenic fungi with out damaging the plants themselves. In other words, the compounds are absorbed by the plants and distributed throughout the plant system, whence they exert their fungitoxic activity. Thus the compounds are useful for combatting infestation of agricultural and ornamental plants by a large variety of phytopathogenic fungi; they may be applied by topical application, such as spraying or dusting, or by treating the soil in which the plants are growing.

The compounds according to the present invention are especially effective against genuine mildew fungi on such cultivated plants as wheat, cucumbers, baneberry root, apple trees, gooseberries and ornamental plants; against rust fungi on wheat, beans and ornamental plants; against the cause of apple scab (*Venturia inequalis*); and against the cause of grey mildew, such as *Botrytis cinerea*.

Especially effective fungitoxics against genuine mildew fungi, either by topical or soil treatment, are the end products of Examples 1 and 7.

For use in combatting phytopathogenic fungi, the compounds of the present invention are compounded with conventional inert additives, such as solvents, diluents, carriers, wetting agents, adhesion agents, emulsifiers and/or dispersants, optionally together with other biocidal agents, into conventional types of fungicidal compositions, such as suspensions, emulsions, solutions, powders, granulates or aerosols. The effective fungitoxic concentration of the compounds according to the present invention in these compositions may range from 0.0001 to 90 percent by weight, based on the total weight of the composition, depending upon the method of application and the desired degree of the fungitoxic effect. For instance, in sprayable liquid compositions, such as suspensions, emulsions, solutions and aerosols, the effective concentration may be as low as 0.0001 to 1 percent by weight, preferably 0.001 to 0.25 percent, depending upon the desired fungitoxic effect, while in other compositions, such as powders, granulates and so-called low-volume-formulations, the concentration may be as high as 90 percent by weight.

The following examples illustrate a few fungitoxic compositions comprising a compound of the present invention as an active ingredient and represent the best modes contemplated of putting the invention into practical use. The parts are parts by weight unless otherwise specified.

EXAMPLE 17

Wettable powder

The powder is compounded from the following ingredients:

| | Parts |
|---|---|
| A compound of the formula I | 30 |
| Kaolin | 55 |
| Lignin sulfonate | 9 |
| Colloidal silicic acid | 5 |
| Sodium tetrapropylene-benzene sulfonate | 1 |
| Total | 100 |

The ingredients are intimately admixed with each other, and the mixture is ground into a powder. Prior to use, the powder is suspended in a sufficient amount of water to make the concentration of the compound of the formula I in the suspension from 0.0001 to 0.25 percent by weight, depending upon the desired degree of fungitoxic effects. The aqueous suspension is a sprayable effective fungitoxic composition against genuine mildew fungi.

EXAMPLE 18

Aerosol

The aerosol composition is compounded from the following ingredients:

| | Parts |
|---|---|
| A compound of the formula I (0.1).- | |
| N-methyl-pyrrolidone | 10.0 |
| Sesame oil | 0.1 |
| Propellant (mixture of Frigens) | 89.8 |
| Total | 100.0 |

The ingredients, other than the propellant, are admixed with each other, the mixture is charged into an aerosol container, and the container is pressurized with the propellant under pressure or deep refrigeration. The contents of the pressurized container, when discharged through a suitable aerosol valve, are an effective fungitoxic spray composition against genuine mildew fungi.

EXAMPLE 19

Emulsion concentrate

The concentrate is compounded from the following ingredients:

| | Parts |
|---|---|
| A compound of the formula I | 15 |
| Nonylphenol polyglycolether | 20 |
| 1,2Propyleneglycol | 10 |
| N-Methyl-pyrrolidone | 55 |
| Total | 100 |

The ingredients are intimately admixed with each other, and prior to use the resulting concentrate is diluted with a sufficient amount of water to make the concentration of the compound of the formula I in the aqueous emulsion from 0.0001 to 0.25 percent by weight, depending upon the desired degree of fungitoxic action. The aqueous emulsion is an effective fungitoxic spray composition against genuine mildew fungi.

EXAMPLE 20

Ultra-low-volume concentrate

The concentrate is compounded from the following ingredients:

| | Parts |
|---|---|
| A compound of the formula I | 20 |
| Triethyleneglycol | 38 |
| N-Methyl-pyrrolidone | 42 |
| Total | 100 |

The ingredients are intimately admixed with each other, and the resulting mixture is an effective fungitoxic ultra-low-volume spray composition against genuine mildew fungi.

EXAMPLE 21

Seed disinfectant powder

The powder is compounded from the following ingredients:

| | Parts |
|---|---|
| A compound of the formula I | 90 |
| Kaolin | 8 |
| Sodium diisobutyl-naphthalene sulfonate | 2 |
| Total | 100 |

The ingredients are intimately admixed with each other, and the mixture is ground into a powder, which is an effective fungitoxic seed disinfectant against genuine mildew fungi.

The same results are obtained with a powder compounded in like manner from the following ingredients:

| | Parts |
|---|---|
| A compound of the formula I | 75 |
| Phenylmercury-pyrocatechol | 5 |
| Dyestuffs | 3 |
| Kaolin | 14 |
| Sodium diisobutyl-naphthalene sulfonate | 3 |
| Total | 100 |

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

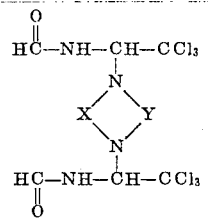

wherein X is $-(CH_2)_2-$ or $$-CH-CH_2-$$
$$\phantom{-CH-}|$$
$$\phantom{-CH-}CH_3$$

and Y is $$-CH-, \quad \overset{\displaystyle C}{\underset{\displaystyle }{\diagdown}} \overset{A}{\diagup}$$
$$\phantom{-}|$$
$$\phantom{-}Z$$

where Z is hydrogen, phenyl, chlorophenyl, 2-furyl or 2-pyridyl; and A is tetramethylene or pentamethylene, each optionally having from 1 to 3 (alkyl of 1 to 4 carbon atoms)-substituents attached thereto.

2. A compound according to claim 1, which is N,N'-bis-[(1'-formamido-2',2',2'-trichloro)-ethyl]-imidazolidine.

3. A compound according to claim 1, which is N,N'-bis-[(1'-formamido-2',2',2'-trichloro)-ethyl]-2,2-pentamethylene-imidazolidine.

* * * * *